March 25, 1952 T. E. GOLLNICK 2,590,400
TREE SPRAYER

Filed June 6, 1949 3 Sheets-Sheet 1

Inventor
Theodore Edward Gollnick

By Clarence A. O'Brien
and Harvey B. Jacobson
Attorneys

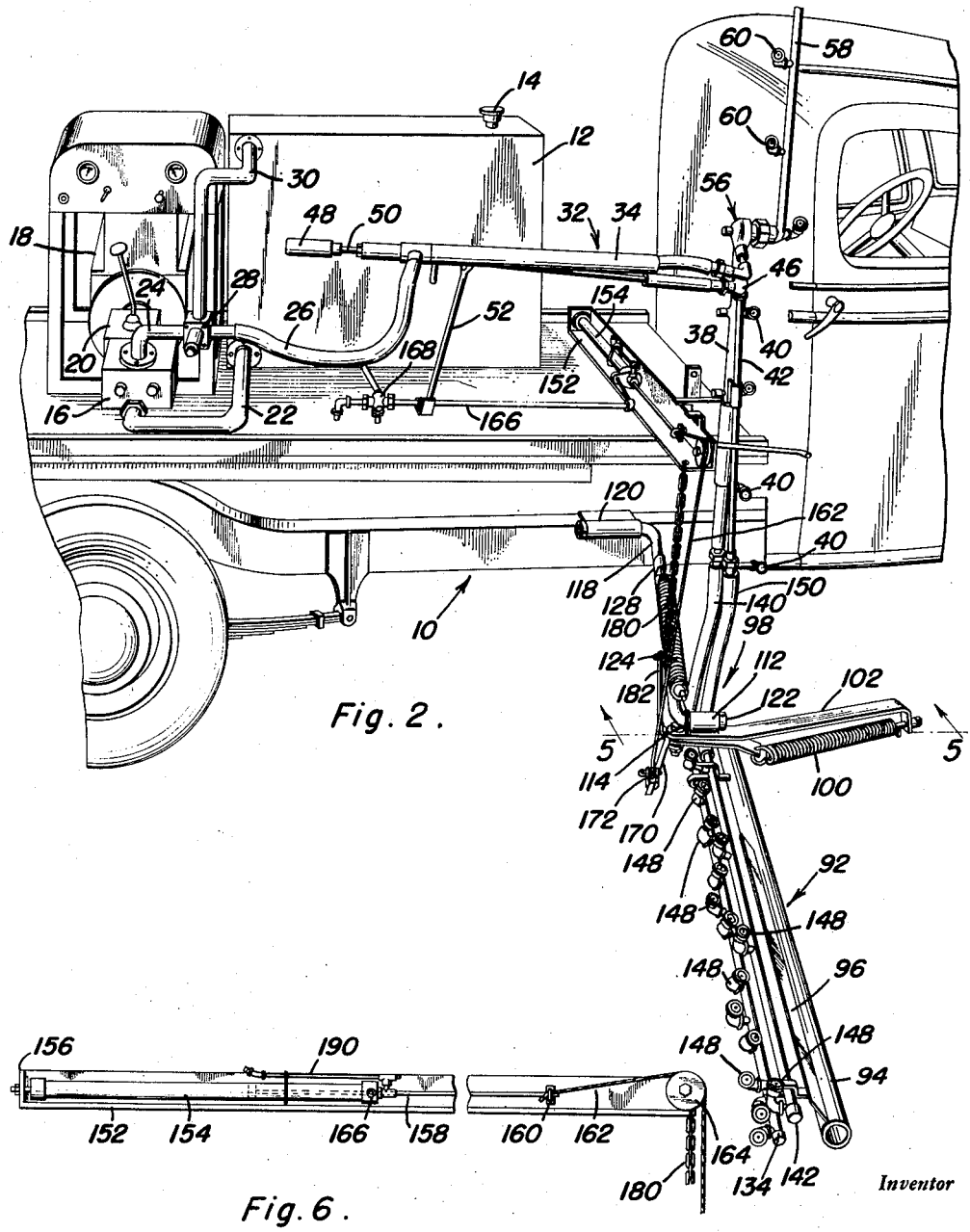

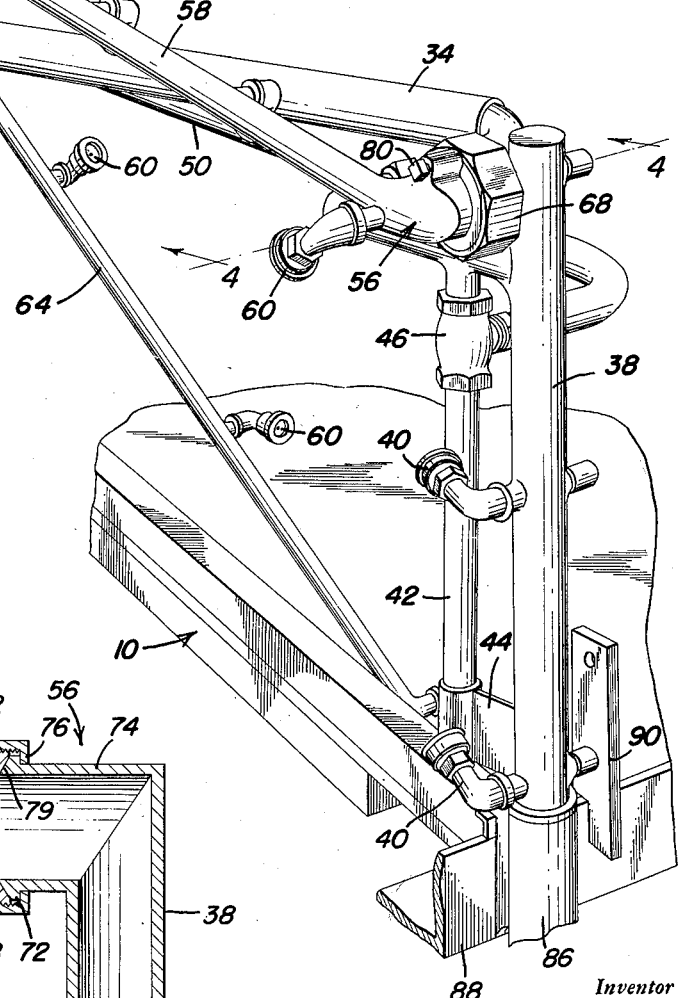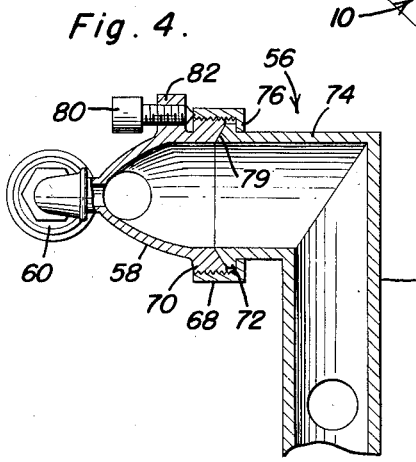

Patented Mar. 25, 1952

2,590,400

UNITED STATES PATENT OFFICE 2,590,400

TREE SPRAYER

Theodore Edward Gollnick, Fort Pierce, Fla., assignor of fifty per cent to Helen Gollnick, Fort Pierce, Fla.

Application June 6, 1949, Serial No. 97,358

7 Claims. (Cl. 299—41)

This invention relates to novel and useful improvements in spray apparatus.

An object of this invention is to spray trees more effectively and completely by directing sprays of material on the appropriate and proper portions of a tree by means of an apparatus which is in itself controllable as to direction of spray and which is carried by a vehicle of conventional description; the spray apparatus being so disposed with respect to the vehicle that it may be folded thereon when inoperative and folded outwardly when operative through mechanical power and which includes main spray conduits or lines together with a valve controlled auxiliary line to spray from beneath the main part of the foliage of the tree in selected density of spray fluid.

Another object of this invention is to so dispose the bottom part of the spray apparatus with respect to the ground that a spray boom striking an object allows pivotal operation of the boom which supports a pair of spray discharge members whereby there is little likelihood of damage due to obstacles adjacent the bottom of the trees, the pivotal operation being opposed by means of a spring so that the boom together with the spray discharge members carried thereby are returned to the normal position upon passing the obstacle.

Other objects and features include simplicity of structure and effectiveness in operation and will become apparent in following the description of the preferred form of the invention, illustrated in the accompanying drawings, wherein:

Figure 2 is a perspective view of the attachment showing it applied to a different type of vehicle;

Figure 3 is a perspective view of a part of the discharge apparatus showing it in the folded position on the vehicle truck body of Figure 2;

Figure 4 is a sectional view illustrating details of construction and showing particularly a swivel connection taken on the line 4—4 of Figure 3 and in the direction of the arrows;

Figure 6 is an elevational detail of construction showing a piston-cylinder arrangement for raising and lowering a part of the spray apparatus.

Figure 1:
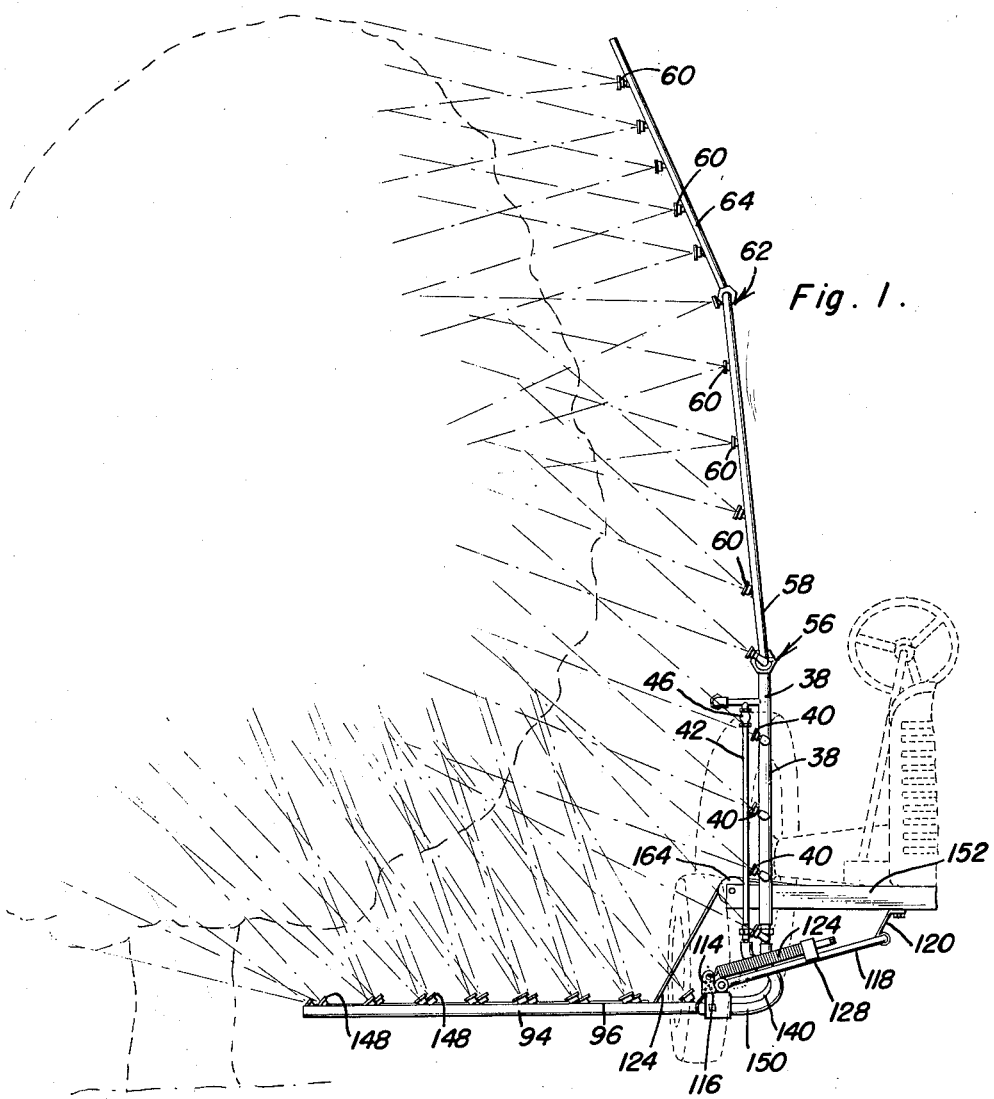
Figure 1 is an elevational front view of the attachment or device showing the same applied to a conventional vehicle in phantom and showing the same operatively associated with a tree.

In Figure 2 there is a vehicle 10 of conventional character illustrated having a truck body and various appurtenances contiguous to conventional vehicles. Mounted on the truck body is a storage tank 12 having a filler inlet member 14. A purely conventional pump is schematically shown at 16 and this pump derives its power from a conventional motor also schematically shown at 18 with a suitable transmission 20 interposed between the pump and the motor. Connected with the inlet side of the pump 16 is a line 22 which is secured in communication with the lower part of the storage tank 12. An outlet line 24 is connected with a flexible tube 26 and a suitable valve 28 is disposed in the line between the pump 16 and the flexible line 26. Extending from the valve 28 is a by-pass line 30 which terminates adjacent the top of the tank 12. Accordingly, upon manipulation of the valve 28 fluid may be pumped selectively into the flexible line 26 or into the by-pass line 30 for recirculation.

The lines 26 and 28 form a part of a feed line broadly indicated at 32, which also includes a pipe 34 connected for fluid flow with the flexible line 26 which terminates in the substantially vertical conduit 38 which has a plurality of nozzles 40 carried thereby. These nozzles are directed at various angles and may be shifted slightly to obtain maximum coverage and accordingly maximum necessary efficiency.

Also extending from the line 34 is a substantially vertical feed pipe 42 which is disposed substantially parallel to the conduit 38 and which is held in place by means of conventional brackets 44. This feed pipe has a valve 46 of conventional description therein for controlling the flow through the feed pipes 42. To operate the valve 46 a handle 48 is supplied with a rather long rod 50 which terminates in the valve and more specifically which attaches to the valve stem (not shown) of the valve 46. A support 52 is fixed at one end to the vehicle body and holds at the other end the valve operating rod 50 and supports the line 32.

By means of a union 56, an extension 58 is fixed to the conduit 38 and has a number of nozzles 60 extending therefrom. The nozzles are attached to the extension and to the conduit 38 by means of conventional suitable pipe fittings so that the spray is directed in the desired manner.

Another union 62 pivotally connects a second extension 64 to the outermost end of the extension 58 and this second extension also has nozzles 60 thereon. By means of the union the extensions and the conduit are connected to conduct fluid but may be pivotally operated so that they are in the folded position for transportation from one location to another.

The specific structure of each union is seen best in Figure 4. An internally threaded collar 68 is disposed on the externally threaded circumferential shoulder 70 carried by the end of the extension 58. A shoulder 72 disposed on the right angular end portion 74 of the conduit 38 is also disposed within the confines of the collar 68 and forms an abutment which cooperates with the flange 76 of the collar 68. The beveled edges 79 of the right angular end portion 74 and the end of the extension 58 are in engagement and by tightening the collar 68 on the threads previously mentioned, the shoulder 72 together with the flange 76 pull the beveled end portions against each other tightly.

A set screw 80 which is carried in a threaded boss 82 may be tightened to clampingly engage the collar 68 so that after the collar is pulled tight the set screw prevents movement thereof, whereby the extension 60 is held in the desired adjusted position. In Figure 4 the apertures illustrated are the ones wherein the nozzle mechanisms or discharge members are attached. Each union (62 and 56) is substantially the same in construction.

A sleeve (Fig. 3) 86 is fixed to the structural framing 88 of the vehicle and has the conduit 38 disposed therein in order to hold it in the substantially vertical position. Bracing 90 is supplied in connection with the conduit 38 and other suitable bracing may be resorted to where it is found desirable.

A normally horizontal spray boom generally indicated at 92 is used at the lower end of the device and is adapted to be disposed adjacent the ground when the device is in operation. This boom 92 includes a tube 94 having an angularly inclined (with respect to the horizontal or vertical) shield 96 carried thereby to form a bumper or baffle and to direct any foreign object over the nozzles to be described subsequently rather than directly thereinto.

A universal joint 98 is fixed at the inner end of the boom 92 so that the boom may be moved in a substantially vertical plane and also in a substantially horizontal plane. The means for moving the boom 92 in the horizontal plane is the striking of an impediment or obstacle in the line of travel. The means for returning the boom 92 after it has been moved in a horizontal plane is a spring 100. This spring is attached to a bracket 102 at one end through the medium of an end coupling 104 and at the other end to a plate 106 by means of having the last named end of the spring passed through an opening 108 formed in the plate 106.

The bracket 102 forms a part of the universal joint 98 and has a pivot pin 110 passed through a suitable opening provided in the flat part thereof. This pin also passes through a similar opening formed in the plate 106 so that the bracket 102 may be moved pivotally with respect to the plate 106 about the pin 110 as a vertical axis.

A substantially horizontal bearing 112 is disposed on the bracket 102 and has an ear 114 with one or more apertures 116 therein. A pitman rod 118 having right angular end portions is supplied. One end of the pitman 118 is carried by a bearing type bracket 120 which is fixed to the chassis of the vehicle 10. The opposite end is disposed in the bearing 112 and held in place by a collar 122 which is pinned thereto. Hence, the pitman rod 118 has one end thereof forming a part of the universal joint 98 and has the other end thereof serving in the capacity to attach a part of the device to a vehicle for pivotal movement so that the entire universal joint together with the boom 92 will move pivotally in a vertical plane.

Since the spray boom 92 which includes the tube 94 is welded or otherwise firmly fixed to the plate 106, the entire boom will pivot about the lower end portion of the pitman 118 which is disposed in the bearing 112. In order that the entire boom will be resiliently mounted so that it will float slightly, the weight of the boom 92 is carried by means of a spring 124 which has one end disposed in one of the openings 116 and has the other end fixed to a bracket 128. The bracket 128 is fixed to the pitman rod 118 intermediate the ends thereof.

Figure 5:
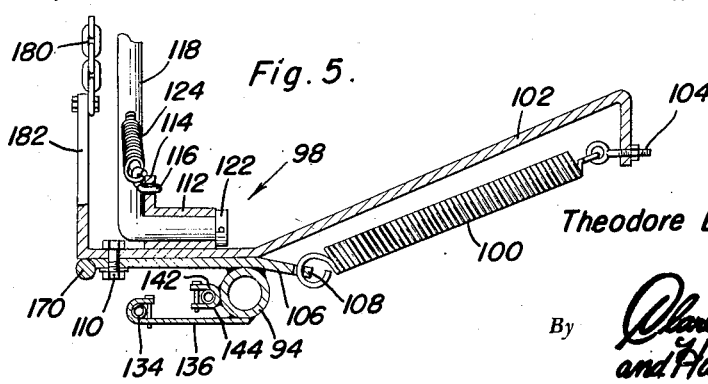
Figure 5 is a sectional view taken on the line 5—5 of Figure 2 and in the direction of the arrows illustrating a part of the universal joint connection for mounting the spray boom and two of the discharge conduits.

Again referring to the parts of the device which are used for actual spraying, there is a discharge pipe 134 disposed on a carrier plate 136 which is welded or otherwise rigidly secured to the tube 94 (Fig. 5). This discharge pipe has its inner end connected for fluid flow with the conduit 38 through the medium of a flexible line 140. (Fig. 2.)

An auxiliary spray line 142 is carried by the tube 94 (Fig. 5) and is held in place by means of suitable small brackets 144. Both the auxiliary spray line and the discharge pipes 142 and 134 respectively have nozzles or spray outlet members 148 carried thereby. These particular nozzles are used for spraying upwardly from the lower part of the tree as shown in Figure 1.

Since the valve 46 which is operated by the handle 48 controls fluid flow through the supply line 42 and the supply line 42 is connected with the auxiliary spray line by means of a flexible tube 150, the utility and amount of spray material which is issued through the auxiliary spray line 142 is capable of regulation. Hence, the density of issuing fluid toward the bottom of the tree may be regulated by the utility of the valve 42.

An angle iron member 152 is disposed on the truck body transversely thereof. A cylinder 154 is disposed on the angle iron and has one end reacting on a stop 156 secured to the end of the angle iron. A piston including a piston rod 158 is disposed in the cylinder 154 and has a cable clamp 160 at the outer end thereof. This cable clamp secures the cable 162 thereto which is entrained around a guide pulley 164 also carried by the angle iron 152. Through the medium of a hydraulic fluid supply line 166, fluid under pressure is introduced into the cylinder and against the piston to pull the cable 162. The hydraulic fluid under pressure is obtained through a conventional system found in substantially all tractors. A control valve 168 is disposed in the hydraulic fluid supply line 166 and is manually operable to regulate the operation of the piston-cylinder construction.

Fixed to the plate 106 is a bracket 170 which has a cable coupling 172 at the end thereof which anchors the cable 162. Hence, upon operation of the piston within the cylinder 154, the cable 162 pulls the bracket 170 upwardly in order to rotate the spray boom 92 about the lower end of the pitman 118 which is disposed in the bearing 112 as an axis. This raises the boom 92 to the inoperative position. A limiting chain 180 or another cable, is secured at one end to the angle iron and at the other end to a bracket 182 which is secured to the said bracket 102. This chain prevents the pitman 118 from being rotated within the bearing type bracket 120 too great an amount so that the boom 92 simply drags on the ground.

In order to introduce fluid into the hydraulic system it has been found advantageous to use the hydraulic fluid receiving member 190 disposed in a convenient location at the end of the cylinder 154. The lines may be bled through this member as well as new fluid introduced therein.

Having described the invention, what is claimed as new is:

1. A spray apparatus for use on a vehicle comprising a storage tank having a pump operatively connected therewith, a conduit located on one side of the vehicle and having nozzles and a feed line connected with the outlet side of said pump and said conduit, a conduit extension on said side of the vehicle and having nozzles, means pivotally securing said extension to said conduit, a support arm pivotally secured at one end to the vehicle, a normally horizontal spray boom disposed on said side of the vehicle, a universal joint connecting pivotally the opposite end of said support arm with said boom, yielding means opposing the movement of said boom, and a spray discharge pipe carried by said boom and connected with said conduit by a flexible connection.

2. A spray apparatus for use on a vehicle comprising a storage tank having a pump operatively connected therewith, a conduit located on one side of the vehicle and having nozzles and a feed line connected with the outlet side of said pump and said conduit, a conduit extension on said side of the vehicle and having nozzles, means pivotally securing said extension to said conduit, a support arm pivotally secured at one end to the vehicle, a normally horizontal spray boom disposed on said side of said vehicle, a universal joint connecting pivotally the opposite end of said support arm with said boom, a spray discharge pipe carried by said boom and connected with said conduit by a flexible connection, and means for raising said boom about a part of said universal joint as an axis, the pivotal movement of said boom being in a plane transverse to the raising movement and being responsive to the striking of an obstacle by said boom, and yielding means opposing movement of said boom.

3. The combination of claim 2 and said yielding means including springs respectively opposing the raising of said boom and pivotal movement of said boom in the transverse plane.

4. A spray apparatus for use on a vehicle comprising a storage tank having a pump operatively connected therewith, a conduit located on one side of the vehicle and having nozzles and a feed line connected with the outlet side of said pump and said conduit, a conduit extension on said side of the vehicle and having nozzles, means pivotally securing said extension to said conduit, a support arm pivotally secured at one end to the vehicle, a normally horizontal spray boom disposed on said side of the vehicle, a universal joint connecting the opposite end of said support arm with said boom, a spray discharge pipe carried by said boom and connected with said conduit by a flexible connection, means for raising said boom about a part of said universal joint as an axis, the pivotal movement of said boom being in a plane transverse to the raising movement and being responsive to the striking of an obstacle by said boom, yielding means opposing movement of said boom, an auxiliary spray line secured to said boom having nozzles and secured to said boom, means connecting said auxiliary pipe with said conduit for fluid flow, and a control valve disposed in said last mentioned means.

5. A mobile spray apparatus comprising a vehicle having a storage tank and a pump for delivering spray material therefrom, a feed line extending from said pump, a substantially vertical conduit having nozzles and secured to one side of said vehicle, a conduit extension pivotally secured to said conduit and having nozzles, a discharge pipe with discharge outlet members therein, means securing said pipe to the vehicle for pivotal movement in a substantially horizontal plane and for pivotal movement in a substantially vertical plane, a normally horizontal spray boom operatively connected with said securing means and located on said side of said vehicle, springs opposing the pivotal operation of said pipe, an auxiliary spray line carried by said boom and means having a flow control valve therein for conducting spray material to said auxiliary spray line.

6. A mobile spray apparatus comprising a vehicle having a storage tank and a pump for delivering spray material therefrom, a feed line extending from said pump, a substantially vertical conduit having nozzles and secured to one side of said vehicle, a conduit extension located on said side of the vehicle and pivotally secured to said conduit and having nozzles, a discharge pipe with discharge outlet members therein, means securing said pipe to the vehicle for pivotal movement in a substantially horizontal plane and for pivotal movement in a substantially vertical plane, a normally horizontal spray boom operatively connected with said securing means and located on said side of the vehicle, spring opposing the pivotal operation of said pipe, an auxiliary spray line carried by said boom, and means having a flow control valve therein for conducting spray material to said auxiliary spray line, and means carried by said vehicle for pivotally raising said boom, auxiliary line and said pipe.

7. A mobile spray apparatus comprising a vehicle having a storage tank and a pump for delivering spray material therefrom, a feed line extending from said pump, a substantially vertical conduit having nozzles and secured to one side of said vehicle, a conduit extension located on said side of said vehicle and pivotally secured to said conduit and having nozzles, a discharge pipe with discharge outlet members therein, means securing said pipe to the vehicle for pivotal movement in a substantially horizontal plane and for pivotal movement in a substantially vertical plane, a normally horizontal spray boom operatively connected with said securing means and located on said side of said vehicle, springs opposing the pivotal operation of said pipe, an auxiliary spray line carried by said boom, said auxiliary spray line having nozzles, and a rearwardly extending shield fixed to said boom to form a baffle to protect said nozzles.

THEODORE EDWARD GOLLNICK.

REFERENCES CITED

The following references are of record in the file of this patent:

UNITED STATES PATENTS

| Number | Name | Date |
| --- | --- | --- |
| 1,974,166 | Thompson et al. | Sept. 18, 1934 |
| 2,226,136 | Parker | Dec. 24, 1940 |
| 2,297,110 | Parker | Sept. 29, 1942 |